United States Patent
Lööv et al.

(10) Patent No.: US 7,840,641 B2
(45) Date of Patent: Nov. 23, 2010

(54) METHOD AND ELECTRONIC DEVICE FOR OBTAINING AN EVALUATION OF AN ELECTRONIC DOCUMENT

(75) Inventors: Gustaf Lööv, Lund (SE); Martin Kretz, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 76 days.

(21) Appl. No.: 12/088,883

(22) PCT Filed: Sep. 22, 2006

(86) PCT No.: PCT/EP2006/066657

§ 371 (c)(1),
(2), (4) Date: Sep. 4, 2008

(87) PCT Pub. No.: WO2007/039498

PCT Pub. Date: Apr. 12, 2007

(65) Prior Publication Data

US 2008/0320077 A1     Dec. 25, 2008

(30) Foreign Application Priority Data

Oct. 3, 2005   (EP) .................................. 05021580

(51) Int. Cl.
*G06F 15/16*   (2006.01)
*G06F 12/00*   (2006.01)

(52) U.S. Cl. ...................................... 709/206; 709/207

(58) Field of Classification Search ................ 709/203, 709/217–219, 223–224, 231–232, 250
See application file for complete search history.

(56) References Cited

U.S. PATENT DOCUMENTS 6,038,598 A  *  3/2000  Danneels .................... 709/219
7,395,498 B2 *  7/2008  Katayama et al. ........... 715/234

(Continued)

FOREIGN PATENT DOCUMENTS

WO     2005/043344     5/2005

OTHER PUBLICATIONS

International Search Report for corresponding PCT Application No. PCT/EP2006/066657 mailed Dec. 6, 2006.

*Primary Examiner*—Zarni Maung
(74) *Attorney, Agent, or Firm*—Renner, Otto, Boisselle & Sklar, LLP

(57) ABSTRACT

A method, an electronic device (110), a computer program product, and a computer readable medium for obtaining an evaluation of an electronic document that is referred to in an acquired electronic document. The electronic device (110) comprises an acquiring unit (111) adapted to acquire an electronic document including one or more references to one or more other electronic documents. The electronic device (110) also comprises a processing unit (112). The processing unit (112) is adapted to retrieve the reference(s) from the acquired electronic document. Furthermore, the processing unit is adapted to send to a second server (130) a request for an evaluation of the electronic document(s) associated with the retrieved reference(s), and receive from the second server (130) a response including the result of the evaluation.

16 Claims, 5 Drawing Sheets

U.S. PATENT DOCUMENTS

| | | |
|---|---|---|
| 2003/0101166 A1 | 5/2003 | Uchino et al. |
| 2003/0172349 A1* | 9/2003 | Katayama et al. ........... 715/513 |
| 2004/0034635 A1 | 2/2004 | Czarnecki et al. |
| 2006/0150111 A1* | 7/2006 | Farber ....................... 715/760 |
| 2006/0239221 A1* | 10/2006 | Burns et al. ................. 370/328 |
| 2006/0253850 A1* | 11/2006 | Bruno et al. ................ 717/173 |
| 2006/0287907 A1* | 12/2006 | Kim ............................ 705/10 |
| 2007/0106641 A1* | 5/2007 | Chi et al. ....................... 707/3 |

\* cited by examiner

METHOD AND ELECTRONIC DEVICE FOR OBTAINING AN EVALUATION OF AN ELECTRONIC DOCUMENT

TECHNICAL FIELD OF THE INVENTION

The invention relates to a method, an electronic device, a computer program product, and a computer readable medium for obtaining an evaluation of an electronic document that is referred to in an acquired electronic document.

DESCRIPTION OF RELATED ART

A global information network, such as e.g. the World Wide Web accessible via the Internet, contains a large amount of information. Locating a desired portion of this information can be challenging.

Information retrieval may be facilitated by the use of a search engine. The objective of the search engine may be to provide a plurality of links matching a search query that has initially been entered by a user. In an attempt to indicate the relevance and/or quality of the links returned in response to the search query, the search engine may assign a rank to the web document that is associated with or corresponds to a certain link. The rank may be designed to reflect the relevance of the web document associated with the certain link based on certain criteria. A drawback with the search engine is that a search query must be entered in order to get the rank of the web document that is associated with the certain link.

According to another solution, the rank may be displayed in the form of a bar chart. For example, a certain web address may be entered in the web browser. Then, the rank of the web document associated with the entered web address is displayed together with the web document in the web browser. However, a drawback with this is that a certain web address must be entered in the web browser in order to get the rank of the web document associated with the entered web address, i.e. the web document must be downloaded.

During a communication session for locating a desired portion of information, the drawbacks mentioned above may bring about problems of excessive use of bandwidth. This is at least partly due to the fact that the overall communication session may involve acquiring or downloading one or several web documents that turns out to be irrelevant. Furthermore, excessive use of bandwidth may involve high power consumption. High power consumption may be a problem if the search engine is used in a battery powered device, because the battery may in that case be drained quickly.

SUMMARY OF THE INVENTION

An object of the present invention is to provide a more efficient method and electronic device for obtaining an evaluation of an electronic document.

According to a first aspect, a method for obtaining an evaluation of at least one electronic document is provided. The method comprises acquiring a first electronic document including at least one reference to at least a second electronic document. Furthermore, the method comprises retrieving the reference from said first electronic document, sending to a server a request for an evaluation of the electronic document associated with the retrieved reference, and receiving from the server a response including the result of the evaluation.

The retrieving may comprise extracting the reference from the first electronic document.

Furthermore, the method may comprise incorporating context data into the request for influencing the evaluation of the electronic document associated with the retrieved reference.

Moreover, the method may comprise integrating the first electronic document with the result of the evaluation.

In an embodiment, the method may further comprise, before the step of acquiring, receiving from an electronic apparatus a request to return the first electronic document to the electronic apparatus. If so, the method may also comprise, after the step of integrating, sending the first electronic document and the evaluation result to the electronic apparatus.

According to a second aspect a computer program product is provided. The computer program product comprises computer program code means for executing the method according to the first aspect, when said computer program code means are run by an electronic device having computer capabilities.

According to a third aspect a computer readable medium is provided. The computer readable medium has stored thereon a computer program product comprising computer program code means for executing the method according to the first aspect, when said computer program code means are run by an electronic device having computer capabilities.

According to a fourth aspect an electronic device for obtaining an evaluation of at least one electronic document is provided. The electronic device comprises an acquiring unit adapted to acquire a first electronic document including at least one reference to at least a second electronic document. Furthermore, the electronic device comprises a processing unit adapted retrieve the reference from said first electronic document, send to a server a request for an evaluation of the electronic document associated with the retrieved reference, and receive from the server a response including the result of the evaluation.

The processing unit may be adapted to extract the reference from the first electronic document.

Furthermore, the request may comprise context data for influencing the evaluation of the electronic document associated with the retrieved reference.

Yet further, the processing unit may be adapted to integrate the first electronic document with the result of the evaluation.

In an embodiment, the processing unit may be adapted to receive from an electronic apparatus a request to return the first electronic document to the electronic apparatus. If so, the electronic device may further be adapted to send the first electronic document and the evaluation result to the electronic apparatus.

According to a fifth aspect a mobile terminal comprising the electronic device according to the fourth aspect is provided. The mobile terminal may e.g. be a mobile telephone communication device, a portable or handheld mobile radio communication device, a mobile radio terminal, a cellphone, a pager, a communicator, an electronic organizer, a smartphone, or a computer.

According to a sixth aspect a server comprising the electronic device according to the fourth aspect is provided. The server may e.g. be a service provider server.

Further embodiments of the invention are defined in the dependent claims.

It should be emphasized that the term "comprises/comprising" when used herein is taken to specify the presence of stated features, integers, steps or components but does not preclude the presence or addition of one or more other fea-

BRIEF DESCRIPTION OF THE DRAWINGS

Further objects, features and advantages of the invention will appear from the following detailed description of embodiments of the invention, reference being made to the accompanying drawings, in which.

DETAILED DESCRIPTION OF EMBODIMENTS

Figure 1:
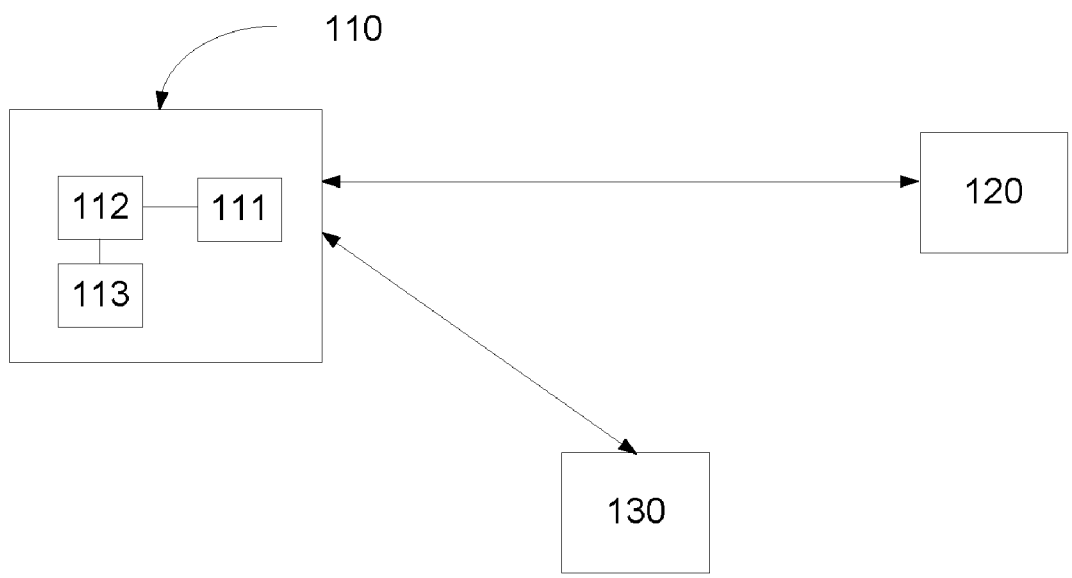
FIG. 1 is a block diagram of a communication network comprising an electronic device, a first server and a second server.

FIG. 1 illustrates a communication network 100. The communication network 100 may comprise an electronic device 110, a first server 120, and a second server 130. The electronic device 110 may be adapted to communicate over the communication network 100, with other electronic devices and/or with other systems or devices coupled to the communication network 100, for example the first and second servers 120 and 130, respectively. The communication network 100 may be an IP-based (Internet Protocol) communication network. This may e.g. allow messaging in 2G, 2.5G and 3G mobile telecommunication networks to be compatible with Internet services.

The electronic device 110 may comprise an acquiring unit 111. The acquiring unit 111 may be a browser unit such as e.g. a web browser unit. The acquiring unit 111 may be used to locate, access and/or acquire electronic documents. As used herein, the term "electronic document" is to be broadly interpreted and is used to describe any electronic document that may contain many forms of information including text, graphics, video, audio, and references to other electronic documents, etc. Accordingly, an electronic document may e.g. be a web page, an e-mail, a PDF document, a Word document, an image, an SVG image (Scalable Vector Graphics), etc. The electronic document may be formatted in a markup language such as e.g. a HyperText Markup Language (HTML), an Extensible Markup Language (XML), an eXtensible Hyper Text Markup Language (XHTML), a Standard Generalized Markup Language (SGML), a Wireless Markup Language (WML), etc.

The acquiring unit 111 of the electronic device 110 may be adapted to acquire an electronic document. This may be done in many different ways. For example, the acquiring unit 111 may be adapted to acquire electronic documents from a memory device such as a CD, DVD or a memory card. With reference to FIG. 1, the acquiring unit 111 may be adapted to acquire downloadable electronic documents from an information network, e.g. via the first server 120. The information network may be a global information network, such as the Internet. Alternatively, the information network may be a local information network. Furthermore, the acquiring unit 111 may be adapted to interpret HTML codes of an acquired electronic document if the acquired electronic document is formatted in HTML. Similarly, the acquiring unit 111 may be adapted to interpret XHTML codes of an acquired electronic document if the acquired electronic document is formatted in XHTML, and so forth. Moreover, the acquiring unit 111 may be adapted to use the HTTP protocol (HyperText Transfer Protocol).

The first server 120 may e.g. be a web server. Furthermore, the first server 120 may be adapted to deliver an electronic document to the electronic device 110. For example, the first server 120 may be adapted to respond to HTTP requests transmitted from the electronic device 110. The electronic device 110 may send a request to the first server 120 requesting the first server 120 to deliver an electronic document. The electronic device 110 may e.g. send the request in the form of a HTTP request. As a response to the request, the first server 120 may subsequently deliver an electronic document to the electronic device 110.

An electronic document may comprise one or more references to one or more other electronic documents. The reference may be an embedded reference. The reference may be embedded in the electronic document. The reference may e.g. be a link or a hyperlink. Furthermore, the reference may comprise an electronic address, such as e.g. a URI address (uniform resource identifier) or a URL address (uniform resource locator). The reference may define a storage location of a certain electronic document. Thus, it is possible to locate the storage location of a certain electronic document that is associated with or corresponds to the reference.

With reference to FIG. 1, a processing unit 112 of the electronic device 110 is adapted to process an electronic document once the electronic document is available in the electronic device 110. To this end, the processing unit 112 may be adapted to retrieve any reference that is in the acquired electronic document. The retrieval of any reference may e.g. comprise analyzing the underlying structure of the acquired electronic document. Furthermore, the retrieval may comprise extracting any reference from the acquired electronic document. For example, the retrieval of any reference may comprise extracting or parsing any reference from the acquired electronic document. Any extracted reference may then be temporarily stored in a memory device 113 within the electronic device 110.

The following exemplifies the extracting or parsing performed with respect to the acquired electronic document. Imagine that the acquired electronic document comprises the following content:

[data: 01234] [reference: 013589] [data: 56789]

wherein [data: 01234] is some displayable textdata, [reference: 013589] is a reference to another electronic document, and [data: 56789] is some other data.

If the data "[data: 01234] [reference: 013589] [data: 56789]" is filtered following the rule that all data starting with "reference" should be extracted and temporarily stored in the memory device 113 and all other data should be removed, the extracted data will have the following content:

"[reference: 013589]"

Hence, this extraction rule may be utilized for accomplishing the retrieval of any reference that is included or embedded in the acquired electronic document. Equivalent rules may also be utilized for accomplishing the retrieval of the reference. For example, the retrieval of the reference may be accomplished by extracting the electronic address of the reference, e.g. the URI address or the URL address. Yet another option is to extract data that starts with "www" or ends with ".se", ".com", etc.

Furthermore, the processing unit 112 may be adapted to read any retrieved reference from the memory device 113. Moreover, the processing unit may be adapted to send, to the second server 130, a request for an evaluation of the electronic document associated with the retrieved reference. The request may e.g. be sent in the form of an HTTP request. In one embodiment, the request comprises any retrieved reference. Furthermore, the request may be a request to return an electronic document associated with the retrieved reference accompanying the request.

In one embodiment, the request may also comprise context data. This context data may comprise data for influencing the evaluation of the electronic document associated with the reference that is comprised in the request. The context data may thus comprise data that put limits to the evaluation of a reference accompanying the request. The context data may contain many forms of information such as e.g.: the nature of the acquired electronic document or the nature of previously acquired electronic documents. The context data may additionally, or alternatively, include preset categories of interests relating to a user of the electronic device 110, and/or the nature of the electronic device 110 such as e.g. whether said electronic device 110 is compatible with certain electronic documents or whether said electronic device 110 permits reception of electronic documents comprising certain content, e.g. adult content, advertising content, etc.

The second server 130 may be adapted to evaluate the electronic document associated with the retrieved reference upon receipt of the request from the electronic device 110. The second server 130 may e.g. be adapted to evaluate the electronic document associated with any reference that is accompanying the request. A response including the evaluation result of each of the references accompanying the rank request may thus be returned to the electronic device 110.

The evaluation performed by the second server 130 may e.g. be based on the contents of the electronic document associated with the reference, for which an evaluation has been requested. Alternatively or additionally, the evaluation may be based on other data than the contents of the electronic document, such as e.g. the number of electronic documents referring to the electronic document, for which an evaluation has been requested, the amount of advertising content, etc. Furthermore, the evaluation may include assigning a rank, e.g. in the form of a numerical value, to each of the retrieved references, for which an evaluation has been requested. The evaluation itself may be performed according to known principles and will not be further explained here. In addition, the evaluation may be based on context data if context data is accompanying the request.

The processing unit 112 of the electronic device 110 may also be adapted to receive the response from the second server 130. The response may include the result of the evaluation, such as a rank. Yet further, the processing unit 112 may be adapted to integrate the received result of the evaluation with the acquired electronic document. Thus, the processing unit 112 may be adapted to put together the acquired electronic document and the evaluation result received with the response. In particular, the processing unit 112 may be adapted to put together the evaluation result of the electronic document(s) associated with any reference(s) to the respective reference(s) of the acquired electronic document. As a consequence, the electronic device 110 may be adapted to obtain the evaluation result of the electronic document associated with any reference that is referred to in the acquired electronic document.

The result of the evaluation may be integrated with the acquired electronic document. The evaluation may e.g. be integrated such that it will be shown as a bar chart in connection with the reference, for which an evaluation has been requested, when the acquired electronic document is displayed. The evaluation result may alternatively or additionally be integrated such that it is shown in a pop-up window when the acquired electronic document is displayed. The pop-up window may e.g. be shown when a cursor hovers over the reference, for which the evaluation was requested and has been obtained.

Figure 2:
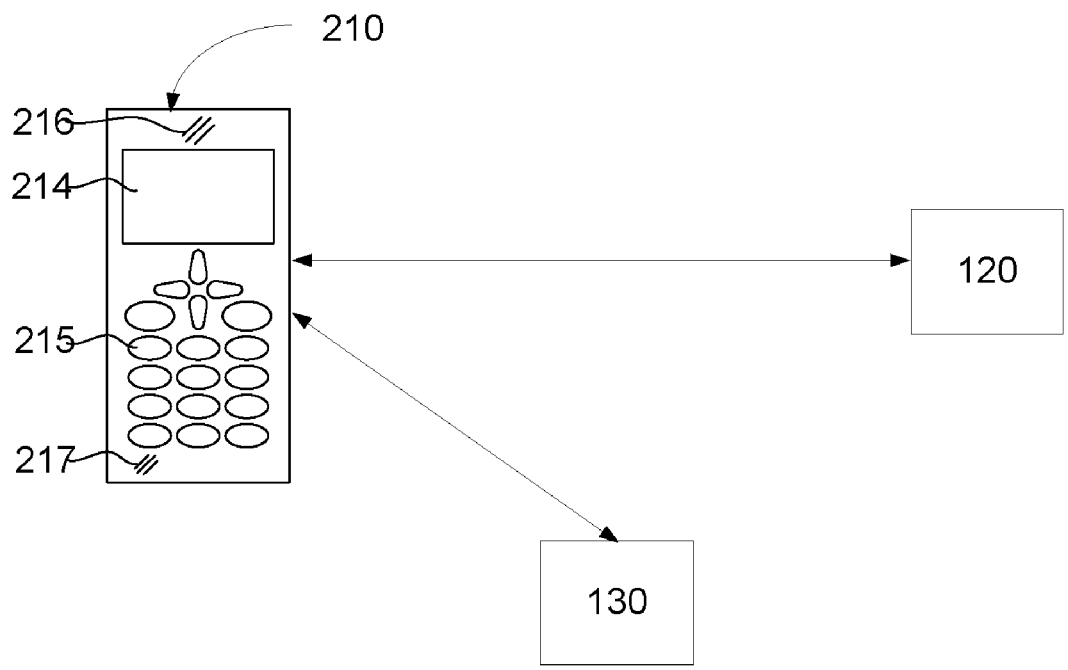
FIG. 2 is a schematic view of a communication network comprising a mobile terminal, a first server and a second server.

With reference to FIG. 2, a schematic view of a communication network is shown. Besides what is described below with reference to FIG. 2, the elements of FIG. 2 having corresponding reference signs in FIG. 1 operate and interact similarly to the description with reference to FIG. 1.

The communication network 200 differs from the communication network previously described with reference to FIG. 1 in that the electronic device 110 is comprised in a mobile terminal 210. In FIG. 2, the mobile terminal 210 is exemplified as a mobile telephone. For convenience and for simplicity of presentation reference will, however, be made to a mobile terminal 210 in the following. This should not be interpreted restrictively, but rather as an example. The electronic device 110 may alternatively be implemented in e.g. a communication device, a portable or handheld mobile radio communication device, a mobile radio terminal, a cellphone, a pager, a communicator, an electronic organizer, a smartphone, a computer, etc.

As is illustrated in FIG. 2, the mobile terminal 210 may comprise a display 214, a keypad/keyboard 215, a loudspeaker 216, and a microphone 217, through which a user may operate and interact with the mobile terminal 210. Furthermore, the mobile terminal 210 may comprise a built-in antenna for communicating speech and/or data with the communication network 200 through a wireless connection. In this embodiment, the mobile terminal 210 may be connectable to the first and second servers 120, 130.

Figure 3:
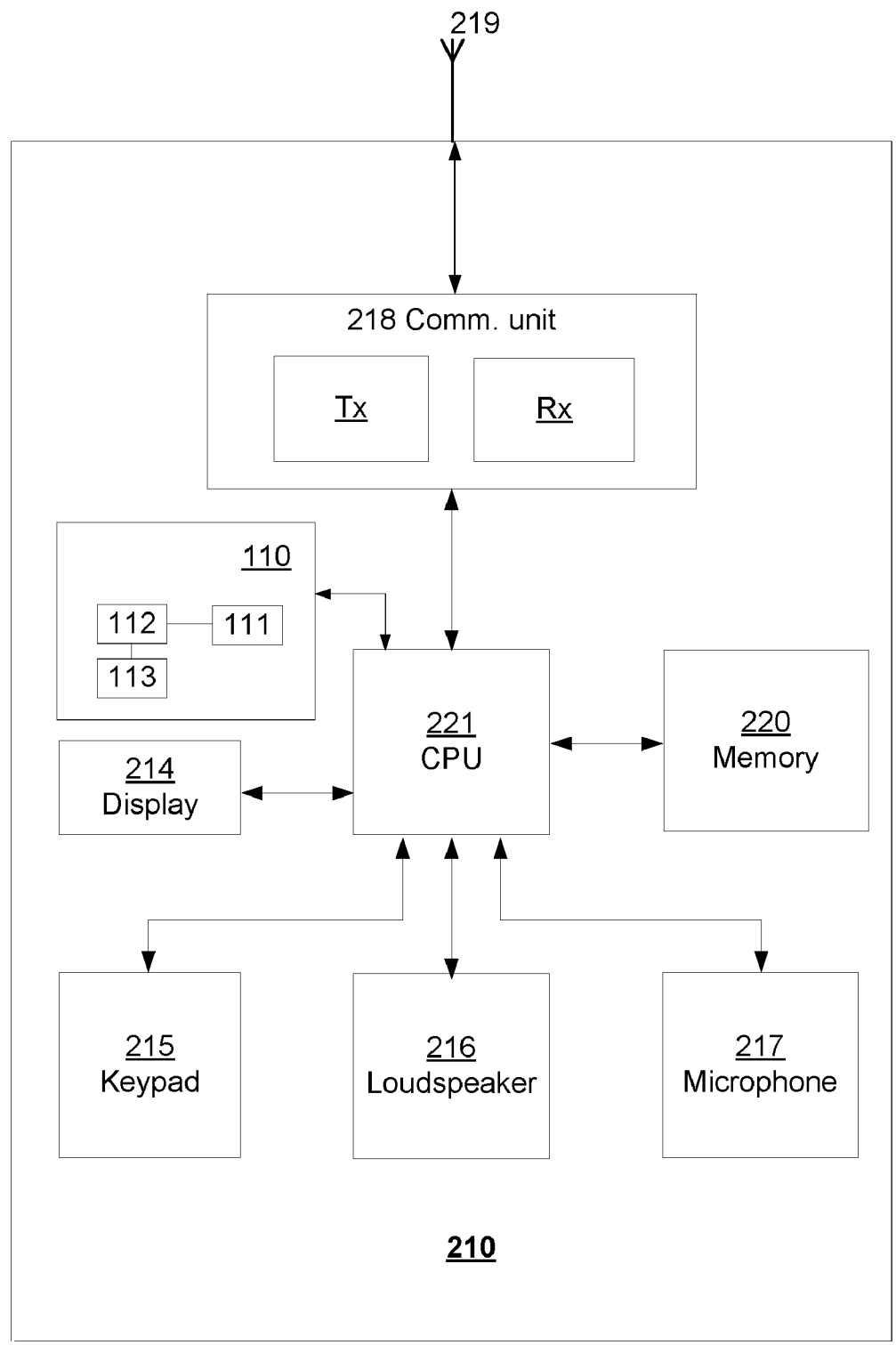
FIG. 3 is a block diagram illustrating some components of the mobile terminal in FIG. 2.

FIG. 3 illustrates certain components, which may be integrated in the mobile terminal 210. A communication unit 218 is operable for communication with external communication devices. The communication unit 218 may comprise a transceiver for communicating, via the antenna 219, with the communication network 200 e.g. according to any communication technology such as GSM (Global System for Mobile communication), UMTS (Universal Mobile Telecommunication System), CDMA2000 (Code Division Multiple Access), PDS (Personal Digital System), or PDC (Personal Digital Cellular). The communication unit 218 may in addition be configured for short-range radio communication, such as e.g. according to Bluetooth®, WLAN or ZigBee® technology.

The mobile terminal 210 may also comprise a memory device 220 adapted to communicate with a CPU 221. Typically, the CPU 221 may be adapted to communicate with the memory device 220 via an address/data bus for controlling the operation and function of the mobile terminal 210. The memory device 220 may be representative of the overall hierarchy of memory devices comprising the software and data used to implement the functionality of the mobile terminal 210. The memory device 220 may e.g. comprise the following types of memory devices: cache, RAM (Random Access Memory), ROM (Read Only Memory), flash memory, non-volatile memories, SIM (Subscriber Identity Module), etc. Data instructions or software for various functions of the mobile terminal 210 may be stored in the memory device 220.

As is illustrated in FIG. 3, the mobile terminal 210 may also comprise the electronic device 110. In FIG. 3, the electronic device 110 is illustrated as a separate unit that may be adapted to communicate over an address/data bus with the CPU 221 of the mobile terminal 210. The electronic device 110 may e.g. be implemented in the form of an ASIC (Application-Specific Integrated Circuit). In another embodiment, the electronic device 110 is provided by the CPU 221 running software therefore. The operation and function of the electronic device 110 has been described in detail above with reference to FIG. 1 and will not be further explained here.

Figure 4:
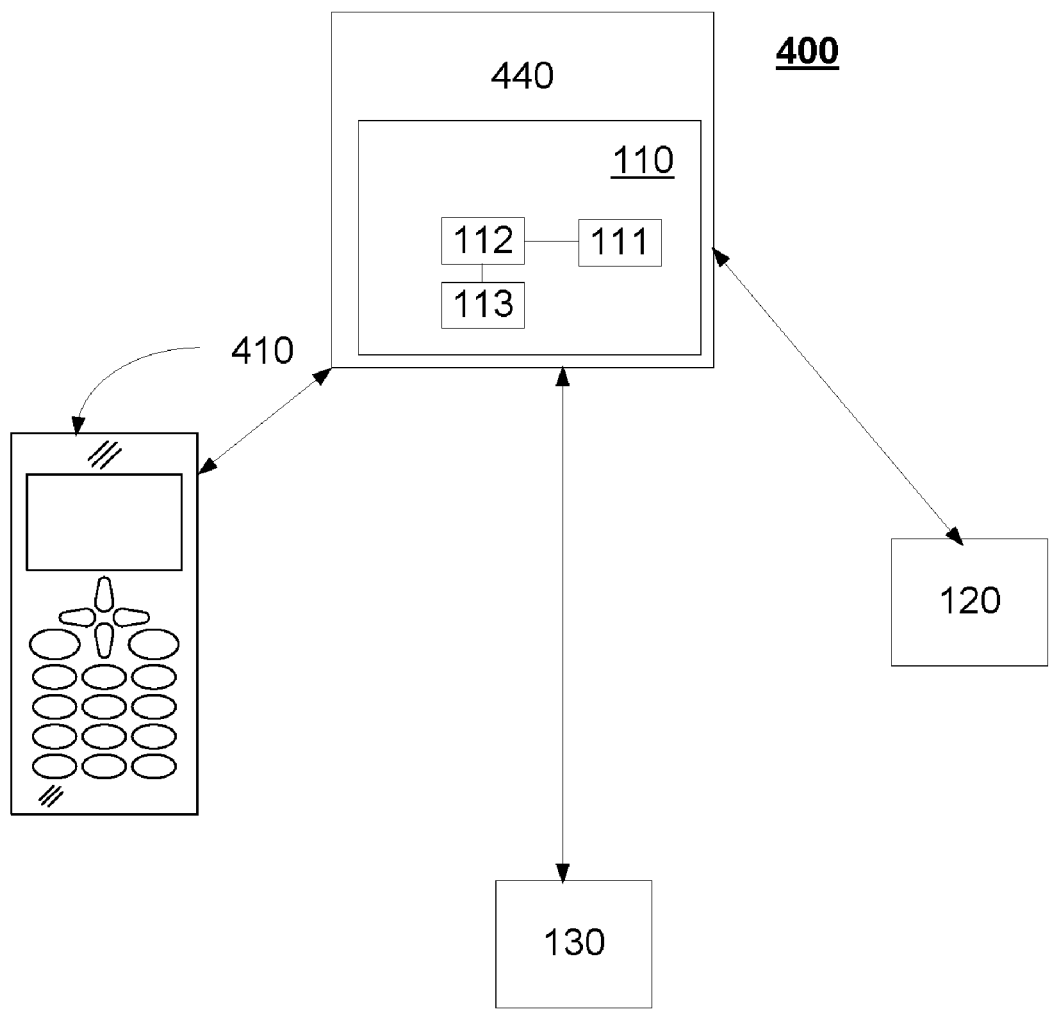
FIG. 4 is a schematic view of a communication network comprising a mobile terminal, a first server, a second server, and a third server.

With reference to FIG. 4, a schematic view of a communication network is illustrated. Besides what is described below with reference to FIG. 4, the elements of FIG. 4 having corresponding reference signs in FIG. 2 operate and interact similarly to the description with reference to FIG. 2.

In the communication network referred to by FIG. 4, the communication network 400 differs from the communication network 200 described with reference to FIG. 2 in that it further includes a service provider server 440. In this embodiment, the electronic device 110 may be integrated in the service provider server 440. The operation and function of the electronic device 110 has been explained in detail above with reference to FIG. 1 and will not be described further here.

In this embodiment, the mobile terminal 410 may be adapted to send a request for requesting the service provider server 440 to return a certain electronic document. The request may e.g. be sent in the form of a HTTP request. The difference between the mobile terminal of FIGS. 2 and 3 and the mobile terminal 440 of FIG. 4 is the that the electronic device 110 is not included in mobile terminal 440. However, in another embodiment, the electronic device 110 is included in both the mobile terminal and the service provide server 440. Any other component described with reference to FIGS. 2 and 3 may also be included in mobile terminal 410.

The service provider server 440 may be adapted to acquire the certain electronic document requested by the mobile terminal 410. This may be accomplished once the service provider has received the request, e.g. in the form of the HTTP request, from the mobile terminal 410. The electronic document may be acquired from the information network, e.g. via the first server 120. Since the electronic device 110 is comprised in the service provider server 440, the service provider server 440 may be adapted to obtain the evaluation result of the electronic document(s) associated with the reference(s) that is referred to in the acquired electronic document. Again, the acquired electronic document may be put together with the evaluation result of the electronic document associated with any reference of the acquired electronic document. This is accomplished once the evaluation result of the electronic document associated with the reference is available in the service provider server 440. Furthermore, the service provider server 440 may be adapted to relay the acquired electronic document to the mobile terminal 410. Thus, the acquired electronic document that is relayed to the mobile terminal 410 may comprise the evaluation result of the electronic document(s) associated with the reference(s) to other electronic document(s) that are comprised in the acquired electronic document.

Furthermore, the mobile terminal 410 may be adapted to acquire the electronic document that was initially requested. For example, the electronic document may be acquired by means of the acquiring unit 111 of the electronic device 110 if it is provided in the mobile terminal 410. Alternatively, the electronic document may be acquired by another acquiring unit comprised in the mobile terminal 410. For example, the another acquiring unit may be a browser application program stored in the memory device 220 of the mobile terminal 410.

Figure 5:
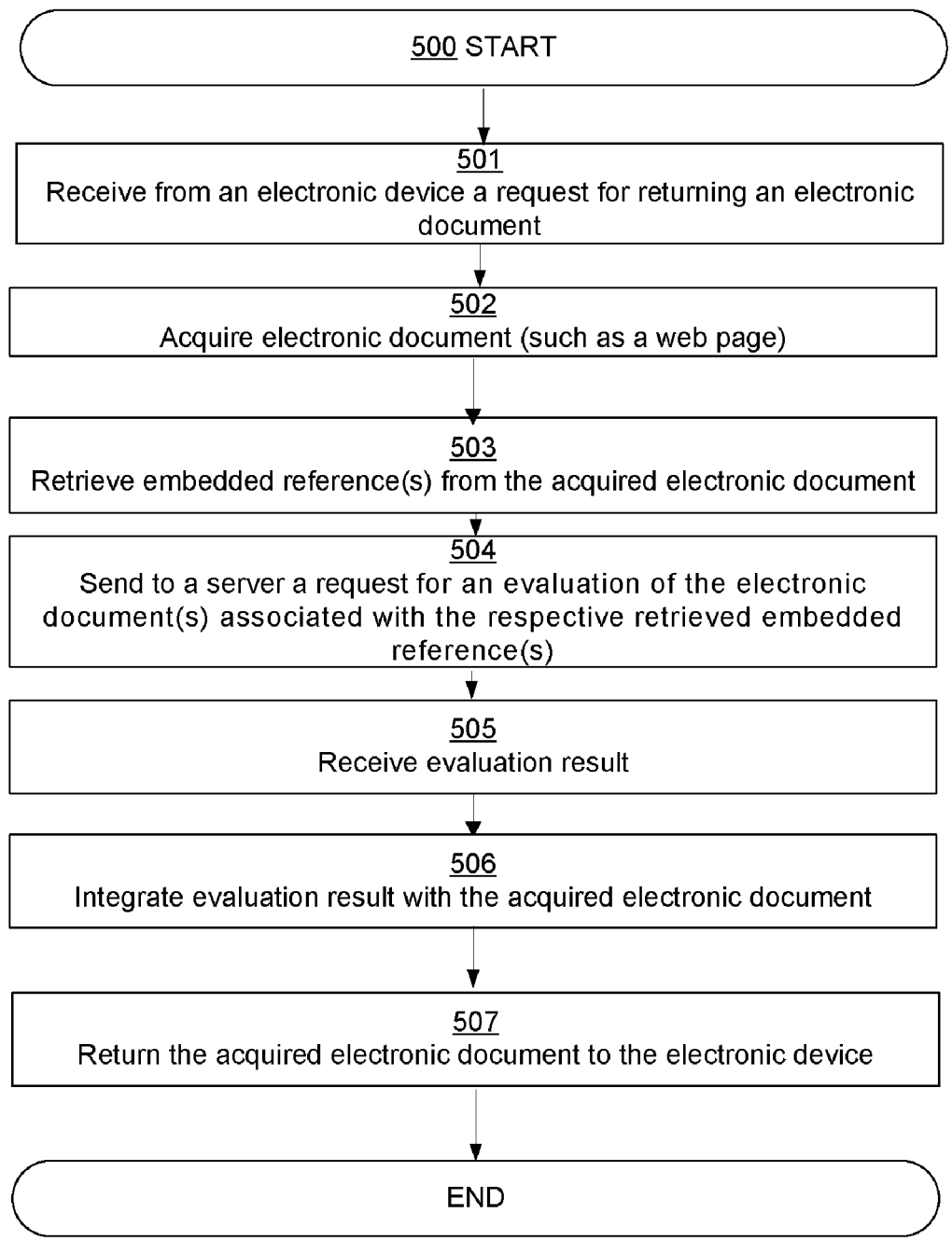
FIG. 5 is a flowchart illustrating an embodiment of a method for obtaining an evaluation of one or several electronic documents.

FIG. 5 illustrates an embodiment of a method for obtaining an evaluation of one or several references in an electronic document. In a step 501, a request is received from an electronic device. The electronic device may for example be a mobile terminal 210 or the like. This request is a request to return a first electronic document to the electronic device. In step 502, the requested electronic document is acquired. This electronic document may comprise one or more references to one or more other electronic documents. In step 503, any reference that is embedded or included in the acquired electronic document will be retrieved from the electronic document. The retrieval has been explained in detail above and will therefore not be further explained here. In a further step, step 504, a request may be sent, to a server 130, for requesting an evaluation of the electronic document associated with the retrieved reference. The request may comprise the reference retrieved in step 503. Furthermore, this request has been explained in detail above and will not be further explained here. In step 505, the response is received from the server 130. The response may include the result of an evaluation of the electronic document associated with the retrieved reference, for which an evaluation has been requested. Then, in step 506, the acquired electronic document may be integrated with the result of the evaluation. This has been explained in detail earlier and will not be further explained here. Then, in a step 507, the first electronic document with the result of the evaluation is sent to the electronic device that requested the first electronic document in step 501. In the embodiments described with reference to FIGS. 1 and 2, it should be appreciated that steps 501 and 507 may be omitted.

The present invention may be embedded in a computer program product, which enables implementation of the method and functions described above. The invention may be carried out when the computer program product is loaded and run in a device having computer capabilities, such as a processor. Computer program, software program, program product, or software, in the present context mean any expression, in any programming language, code or notation, of a set of instructions intended to cause a system having a processing capability to perform a particular function directly or after conversion to another language, code or notation. Furthermore, the computer program product may be stored on a computer readable medium.

It is an advantage that embodiments of the invention make it is possible to obtain an evaluation of the electronic document that is associated with or corresponds to the reference that is referred to in an acquired electronic document. Thus, embodiments of the invention may enable a reduction in the time it takes to locate a desired portion of information, for example, when navigating or surfing electronic documents downloadable from an information network. Thus, embodiments of the invention help a user to find relevant information quickly. It will in general be easy to decide whether it is worth following a certain reference to another electronic document located further away from or beyond the initially acquired electronic document. It is thus possible to avoid following an unnecessary reference. Only a limited amount of bandwidth is required for finding a desired portion of information. Furthermore, a limited overall use of bandwidth may in turn reduce any excessive use of power. Hence, the consumption of processing power may be kept to a minimum.

A further advantage with embodiments of the invention is that they may allow for flexibility in that the electronic device 110 may be integrated in many different devices such as e.g.

the mobile terminal 210. For example, when the electronic device 110 is integrated in the mobile terminal 210, only a limited amount of bandwidth is required for finding a desired portion of information during a communication session. This may increase the efficiency of the communication network in which the mobile terminal 210 is intended to operate. Furthermore, a limited use of bandwidth may reduce any excessive use of power when browsing electronic documents by means of the mobile terminal 210. Thus, the utilization of the available battery time of the mobile terminal 210 may be kept to a minimum. Thus, the available battery power is not drained unnecessarily quickly.

In other embodiments, the electronic device 110 may e.g. be integrated in a remote service provider server 440. It may be an advantage that the processing for obtaining the evaluation result of the electronic document associated with the reference in the acquired electronic document is performed by the service provider server 440, rather than by the mobile terminal 210. This way, the processing power required by the mobile terminal 210 may be even more limited. This may be advantageous when the mobile terminal 210 is a communication device with limited battery power and/or data transfer rate, such as e.g. a mobile telephone.

The present invention has been described above with reference to specific embodiments. However, other embodiments than the above described are equally possible within the scope of the invention. The invention could be applicable in situations other than those described herein. Different method steps than those described herein, performing the method by hardware or software or a combination of hardware and software, may be provided within the scope of the invention. The different features and steps of the invention may be combined in other combinations than those described. The scope of the invention is only limited by the appended patent claims.

The invention claimed is:

1. A method for obtaining an evaluation of at least one electronic document, comprising acquiring a first electronic document including at least one reference to at least a second electronic document, comprising:
   retrieving the reference to the second electronic document from said first electronic document,
   sending to a server a request for an evaluation of the second electronic document associated with the retrieved reference, the request comprising the retrieved reference to the second electronic document without transmitting said second document, and
   receiving from the server a response including the result of the evaluation.

2. The method of claim 1, wherein the retrieving comprises:
   extracting the reference from the first electronic document.

3. The method of claim 1, further comprising incorporating context data into said request for influencing the evaluation of the electronic document associated with the retrieved reference.

4. The method of claim 1, further comprising integrating the first electronic document with the result of the evaluation.

5. The method of claim 1, comprising before the step of acquiring:
   receiving from an electronic apparatus a request to return the first electronic document to the electronic apparatus.

6. The method of claim 5, comprising after the step of integrating:
   sending the first electronic document and the result of the evaluation to the electronic apparatus.

7. A non-transitory computer readable medium storing a computer program comprising computer program code means for executing the method according to claim 1, when said computer program code means are run by an electronic device having computer capabilities.

8. An electronic device for obtaining an evaluation of at least one electronic document, wherein said electronic device comprises an acquiring unit adapted to acquire a first electronic document including at least one reference to at least a second electronic document, and including:
   a processing unit adapted to retrieve the reference to the second electronic document from said first electronic document, send to a server a request for an evaluation of the second electronic document associated with the retrieved reference, the request comprising the retrieved reference to the second electronic document without transmitting said second document, and receive from the server a response including the result of the evaluation.

9. The electronic device of claim 8, wherein the processing unit is adapted to extract the reference from the first electronic document.

10. The electronic device of claim 8, wherein the request comprises context data for influencing the evaluation of the electronic document associated with the retrieved reference.

11. The electronic device of claim 8, wherein the processing unit is adapted to integrate the first electronic document with the result of the evaluation.

12. The electronic device of claim 8, wherein the electronic device is adapted to receive from an electronic apparatus a request to return the first electronic document to the electronic apparatus.

13. The electronic device of claim 12, wherein the electronic device is further adapted to send the first electronic document to the electronic apparatus.

14. A mobile terminal comprising the electronic device of claim 8.

15. The mobile terminal according to claim 14, wherein the mobile terminal is communication device, a portable or handheld mobile radio communication device, a mobile radio terminal, a cellphone, a pager, a communicator, an electronic organizer, a smartphone, or a computer.

16. A server comprising the electronic device of claim 8.

* * * * *

UNITED STATES PATENT AND TRADEMARK OFFICE
CERTIFICATE OF CORRECTION

PATENT NO. : 7,840,641 B2  
APPLICATION NO. : 12/088883  
DATED : November 23, 2010  
INVENTOR(S) : Gustaf Loov et al.

It is certified that error appears in the above-identified patent and that said Letters Patent is hereby corrected as shown below:

Title Page, CROSS REFERENCE TO RELATED APPLICATION should be added immediately after the title:
-- CROSS REFERENCE TO RELATED APPLICATION
This application is a §371 of International Application No. PCT/EP2006/066657 filed on September 22, 2006, which claims benefit to U.S. Provisional Application No. 60/726,936 filed on October 14, 2005, and also claims priority to European Application No. 05021580.5 filed on October 3, 2005. --

Title page, item (60), Related U.S. Application Data should be added:
-- Related U.S. Application Data
(60) Provisional Application No. 60/726,936, filed on October 14, 2005. --

Signed and Sealed this  
Fifteenth Day of November, 2011

David J. Kappos  
*Director of the United States Patent and Trademark Office*